United States Patent [19]

Brocia et al.

[11] Patent Number: 5,191,348
[45] Date of Patent: Mar. 2, 1993

[54] RADAR DETECTOR PERFORMANCE VERIFICATION METHOD AND APPARATUS

[76] Inventors: Robert W. Brocia, 15 Moore Rd., Bronxville, N.Y. 10708; Marie Dagata, 406 E. Ninth St., Apt. 12A, New York, N.Y. 10009

[21] Appl. No.: 845,588

[22] Filed: Mar. 4, 1992

[51] Int. Cl.⁵ ............................................... G01S 7/40
[52] U.S. Cl. ....................................... 342/173; 342/20
[58] Field of Search .......................... 342/20, 165, 173

[56] References Cited

U.S. PATENT DOCUMENTS 3,295,130  12/1966  Prestwood .......................... 342/173

Primary Examiner—T. H. Tubbesing
Attorney, Agent, or Firm—Charles N. J. Ruggiero

[57] ABSTRACT

A method and apparatus for performing simple, rapid and accurate tests to determine the operational status of police band radar detecting equipment. A low-power, hand-held transmitter capable of transmitting signals within police radar bands for testing the receiver section and alerting circuitry of a radar detector.

16 Claims, 3 Drawing Sheets

RADAR DETECTOR PERFORMANCE VERIFICATION METHOD AND APPARATUS

BACKGROUND OF THE INVENTION

1. Field of the Invention

This invention relates to the field of radio receiver and transmitter calibration and testing equipment and, more particularly, to an apparatus and method suitable for the testing of police band radar detectors capable of detecting microwave transmitters of the type used for automobile speed measurement.

2. Description of the Prior Art

There is no known reliable performance verification method or apparatus practical for testing a police radar detecting device. In order to provide background information so that the invention may be completely understood and appreciated in its proper context, reference is made to the following prior art publications:

Article in Car Audio vol. 4 no. 3, pages 92–103, March 1991, entitled "Eight Triband Radar Detectors"; Article in Radio Electronics vol. 61 no. 2, pages 37–38, February 1990, entitled "Radar Detector Tester"; Owner's Manual, Passport radar receiver, copyright 1989 by Cincinnati Microwave, Inc., pages 32–33; Owner's Manual, Bel Vector radar detector, Bel-Tronics Ltd. (copyright unknown); Article in Radio Electronics vol. 57 no. 8, pages 39–42, 85, August 1986, entitled "Radar Speed-Gun Controller"; Article in Radio Electronics vol. 57 no. 7, pages 52, 97, July 1986, entitled "Radar Signal Detector."

The article cited in Car Audio Magazine evaluates the performance of several radar detectors on the X, K, and Ka bands utilizing police speed measurement equipment. This cited method is clearly impractical and prohibitively expensive for routine testing of radar detectors. The article states that radar detector malfunction is not an unusual occurrence illustrating the need for a reliable method and apparatus to verify radar detector performance.

The article cited in Radio Electronics for February 1990 discloses a method and apparatus to compare radar receiving sensitivity between two radar detectors. However, that method and apparatus is used to determine a relative sensitivity. Furthermore, it is believed due to signal strength the operator must leave the automobile in order to effect a change in the field strength meter of the radar detector thus performance verification may not be implemented while the radar detector is in use. It is also believed that the cited apparatus would transmit at power levels against regulatory policy.

Another disclosure which furnishes background information is the above cited Owner's Manual for Passport radar receiver. The method includes an averaging technique of false signals. However, that method requires the presence of routinely encountered false signals on a regular route and is claimed to be a semi-reliable method by this reference. Additionally, the cited method will not test the performance of signals used exclusively for police band radar.

The article cited in Radio Electronics for August 1986 discloses an apparatus for testing and calibrating radar equipment in the laboratory. The disclosed speed-gun controller interferes with police radar and is therefore illegal.

The article cited in Radio Electronics for July 1986 discloses an apparatus to test a radar signal detector by the generation of a non-specific broadband radio frequency signal. An RF signal, such as that derived from the cited apparatus, is believed to be against regulatory policy.

The final reference cited from Bel Vector Owner's Manual discloses an admittedly imprecise method that includes the use of false signals as a performance indicator.

The invention which we describe herein is usable by individuals untrained in the field of electronics for the purpose of performing simple, rapid and accurate tests to determine whether radar detection equipment is functioning. The current method verifies radar detector performance using one radar detector. The method utilizes an apparatus with minimal power output necessary to accomplish the task and can be applied while the radar detector is in use. The current method includes a the proximity measurement, where proximity of radar detector to apparatus varies field strength. This measurement is used as a standard in subsequent tests for precise verification of performance. The current apparatus transmits at three different frequencies thereby testing all police radar band reception of the radar detector.

SUMMARY OF THE PRESENT INVENTION

It is a principal object of this invention to provide a method and apparatus usable by individuals untrained in the field of electronics for the purpose of determining the operational status of a radar detector on all frequencies used by police radar while the detection equipment is in use.

It is another object of this invention that such method and apparatus be suitable for in-the-field operation without interference to equipment operating on the same frequencies.

Whatever the precise merits, features and advantages of the above cited references, none of them achieves or fulfills the purpose of the present disclosure.

Briefly, we have provided a low-power transmitter capable of transmitting signals at all police radar frequencies for testing the receiver section and alerting circuitry of a radar detector. We have adopted a placement procedure to maintain a desired relative physical placement between the radar detector to be tested and the electrical apparatus used to perform the testing functions thereby maintaining a constant field strength for any given signal value being transmitted.

DESCRIPTION OF THE PREFERRED EMBODIMENTS

Figure 1:
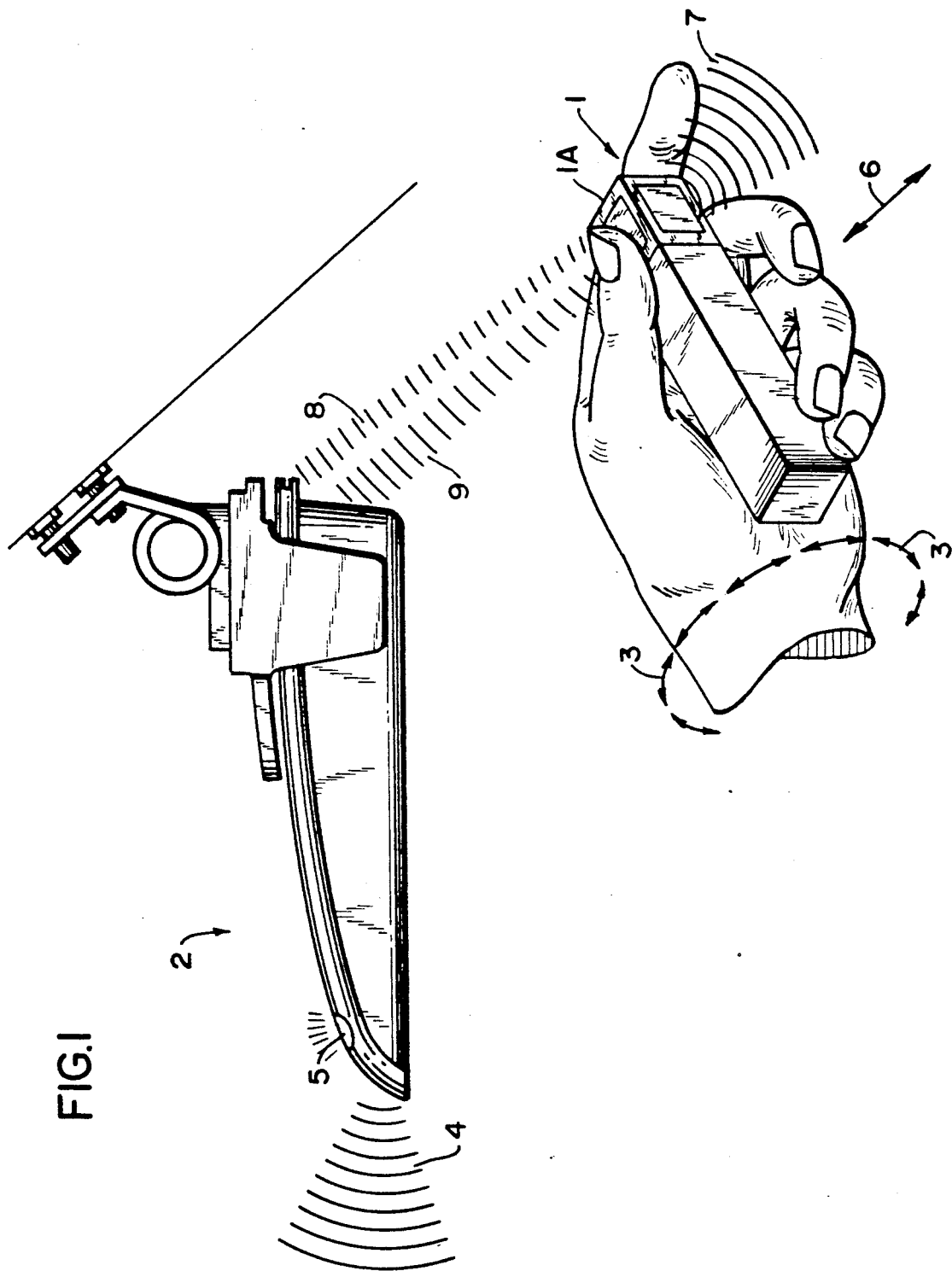
FIG. 1 is a diagrammatic, side view, representation of a preferred embodiment of the invention.

In a preferred embodiment of the invention, FIG. 1, the operator of the invention positions housing 1A of the hand-held electromagnetic field transmitting apparatus 1, transmitting an electromagnetic signal of field strength no greater than 500 microvolts/meter at 3 meters to police band radar detector 2 under test such that the apparatus remains proximal to the radar detector long enough for a visible 5 and audible alert 4 of the detector to activate. The apparatus is then gradually moved distal to the radar detector 2 as depicted by direction 6 of FIG. 1. The loss of signal from the apparatus 1 will be apparent when the radar detector alert circuitry becomes inactive, which at this distal location along direction 6 serves as a distance standard for performance verification of a particular radar frequency. The apparatus is again positioned proximal to the radar detector 2 and rotated according to direction 3, until a different frequency 7, 8 and 9 is realized by the detector under test. The procedure is repeated until all three radar bands have been tested.

Figure 2:
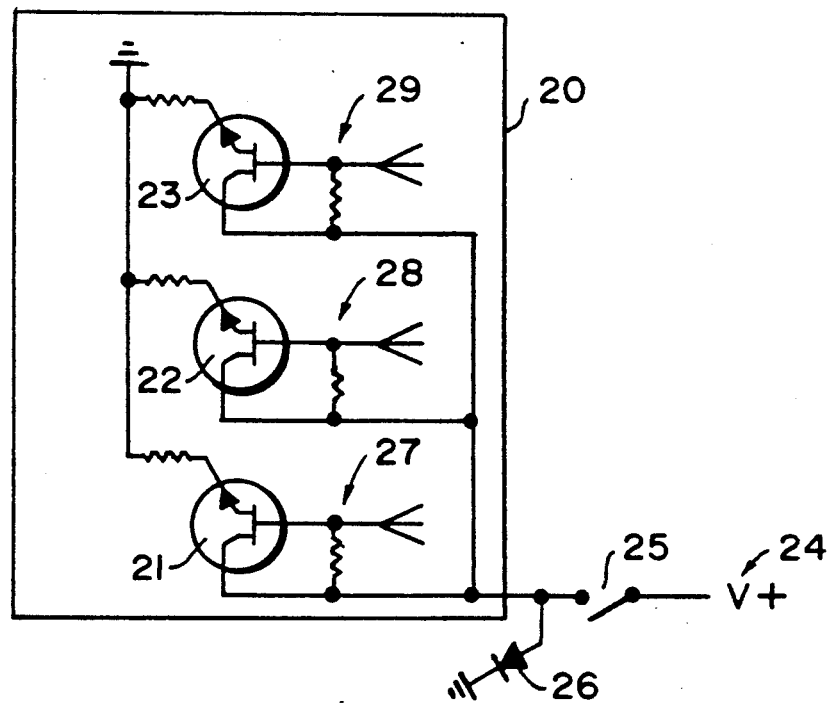
FIG. 2 is a circuit diagram of a transmitter circuit suitable for use in the invention of FIG. 1.

Referring to FIG. 2, power supply 24 may be any suitable power supply capable of supplying the power required to operate high frequency transmitter 20 and voltage indicator 26. It will be appreciated by those skilled in the art that power supply 24 can derive the desired voltages either from a DC source, such as batteries or an automotive electrical system, or from a conventional 117 volt AC power source; such power supply circuitry being well known to those skilled in the electronics field, we shall not go into a detailed circuit discussion here. Voltage is supplied from power supply 24 to transmitter 20 and voltage indicator 26 via switch 25. Transmitter 20 comprises three oscillators 21, 22 and 23 the outputs of which are coupled to antennas 27, 28 and 29, respectively. The term antennae used herein includes any means of radiating energy through space intended to generate a response from a radar detector. Voltage indicator 26 comprises a light emitting diode and alerts the operator of the invention if power supply voltage is weak thereby affecting the integrity of transmitter field strength.

Figure 3:
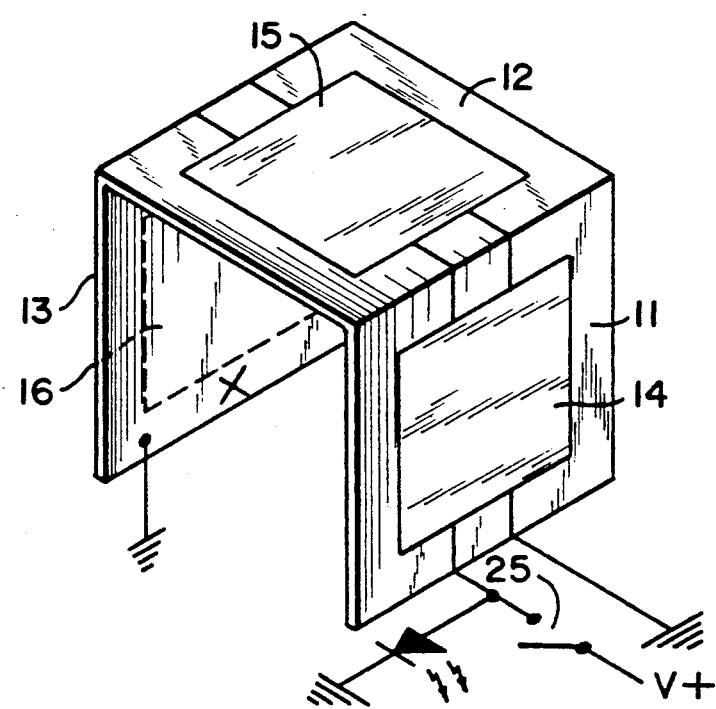
FIG. 3 is a diagrammatic, exploded view of a transmitter configured for use in the invention of FIG. 1.

Referring now to FIG. 3, the housing 1 has three sections 11, 12, 13, of double-sided conductive circuit board material to which the components comprising the transmitting apparatus are mounted in areas corresponding to 14, 15 and 16. The components are mounted on the outboard side while the facing interior plane of each area 14, 15 and 16, is copper or similar conductive material that would be supplied with commercially available double-sided circuit boards. The components are mounted, according to the invention, such that each oscillator/antenna combination is on a separate section 11, 12, 13 of the circuit board; for example, if three oscillators are used, each tuned to a different frequency, each able to be detected by the radar detector, the components are mounted on circuit boards such that each oscillator radiates electromagnetic energy from areas corresponding to 14, 15, 16 in FIG. 3. The arrangement of the components and hence, the oscillators, provides a shielded plane for each frequency transmitted at some fixed point relative to the apparatus if the apparatus were rotated in a clockwise or counterclockwise direction. With this configuration the apparatus will shield two transmitted frequencies from the radar detector while orientating one frequency towards the radar detector under test. With this method and apparatus the action of one switch is all that is necessary to enable selective directional radiation of radio frequency of at least two different signals at a radar detector.

Figure 4:
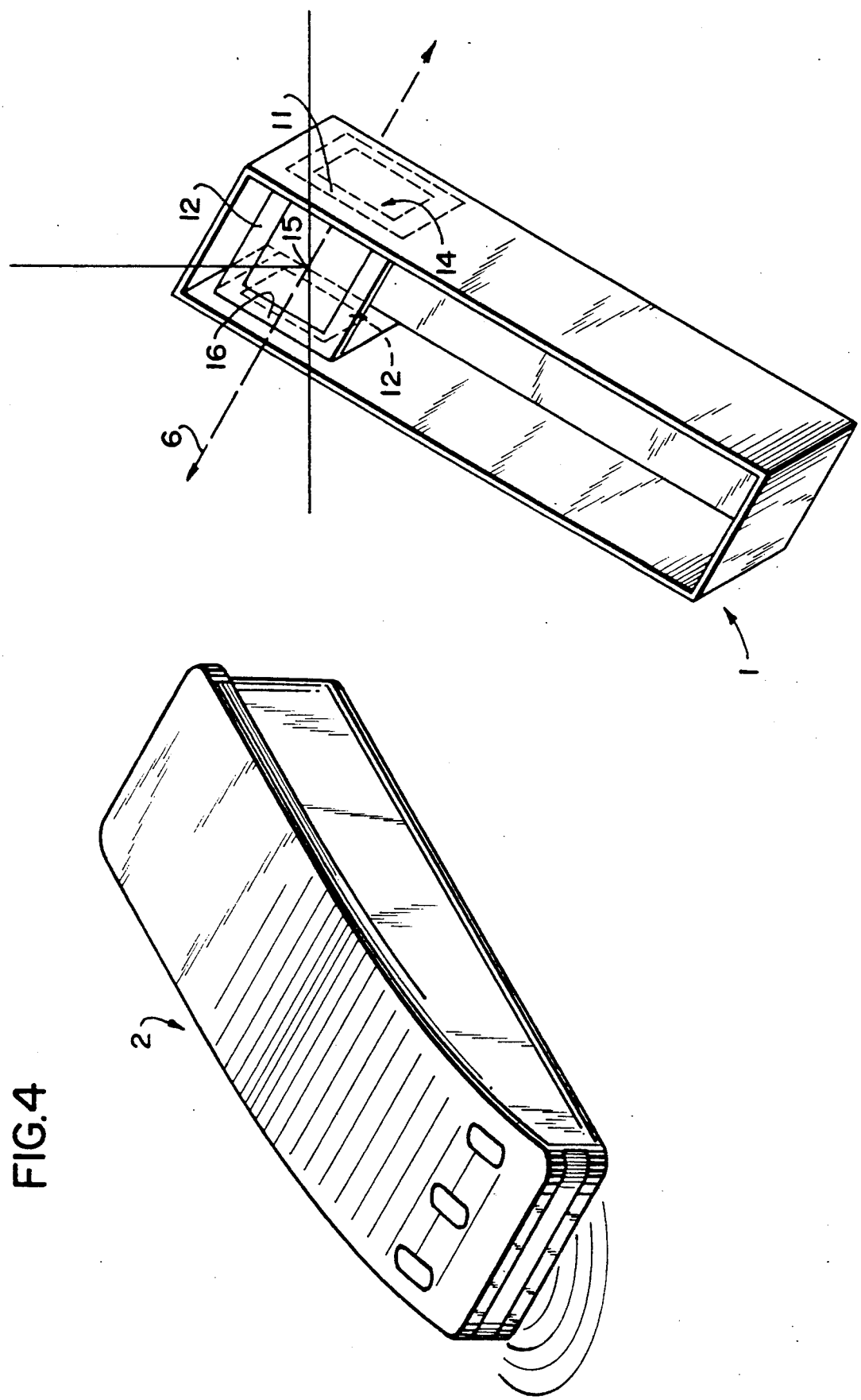
FIG. 4 is a diagrammatic illustration of the method used in the invention of FIG. 1.

As illustrated in FIG. 4, the orientation dependant frequency selection radiated from two parallel and one perpendicular planes 18, 19 and 20, respectively, which corresponds to areas 14, 15 and 16, respectively, generates a response from radar detector 2, distance 6 is increased until radar detector 2 no longer indicates signal presence. The distance 6 at this point will correspond directly to the minimum signal strength with which radar detector 2 recognizes apparatus 1. Any variation in distance 6 indicates a change in performance of the radar detector 2.

It is possible, alternatively, to directly measure the receiving capability of the radar detector by utilizing at least one high frequency transmitter circuit corresponding to X, K or Ka band of the radio frequency spectrum in order to investigate the scope of the radar detector's ability. To directly measure, as used here, includes a non-standardized testing of basic receiver or audible warning circuitry function associated with the frequencies used by police band radar.

It is within the spirit of the invention to provide the lowest power transmitter that enables the operator of the invention to separate radar detector and transmitting apparatus to a point where the radar detector loses the transmitter's signal in a distance thus allowing the invention to be utilized while the radar detector is in use and further preventing the transmitter from interfering with other equipment operating on the same frequency.

Although a particular embodiment of the invention has been described and illustrated herein, it is recognized that modifications, variations, and alternate embodiments may readily occur to those skilled in the art without modifications and equivalents to the preferred embodiment are covered by the appended claims.

We claim:

1. An apparatus for testing a radar detector, said apparatus comprising:
    a housing;
    at least one frequency transmitter mounted in said housing;
    means in said housing for receiving energy from an energy source to power said transmitter;
    voltage indicator means for monitoring voltage of the energy source;
    switch means for connecting said voltage indicator means and said transmitter to said receiving means; and
    shielding means being located in said housing to shield said housing from the frequency from the at least one frequency transmitter.

2. The apparatus according to claim 1, wherein said transmitter comprises means for transmitting within the X band of the radio frequency spectrum.

3. The apparatus according to claim 1, wherein said transmitter comprises means for transmitting within the K band of the radio frequency spectrum.

4. The apparatus according to claim 1, wherein said transmitter comprises means for transmitting within the Ka band of the radio frequency spectrum.

5. The apparatus according to claim 1, wherein the transmitter comprises means for transmitting a high frequency.

6. In a hand-held transmitter for transmitting signals for testing a police band radar detector comprising at least two signal generating devices, an energy source and a shielding means, the improvement comprising means for selective directional radiation of radio frequency of at least two different signals each from one of the at least two signal generating devices at the radar detector, said means including a conductive surface of position dependency with respect to the radar detector for selecting one of said at least two different signals.

7. The hand-held transmitter according to claim 6, wherein the position dependent shielding, with respect to the radar detector, is one side of a double conductor clad circuit board.

8. The hand-held transmitter according to claims 6 or 7, wherein the shielding, which is position dependent with respect to the radar detector, has at least two parallel opposing unshielded planes and one perpendicular unshielded plane.

9. The hand-held transmitter according to claims 6 or 7, wherein the shielding is position dependent with respect to the radar detector, is fixedly connected directly on the inside wall of the transmitter housing whereby the position thereof is changed by changing the orientation of the transmitter housing with respect to the radar detector.

10. The hand-held transmitter according to claims 6 or 7, further comprising an energy source monitoring device mounted on the transmitter housing.

11. The hand-held transmitter according to claim 10, wherein the energy source monitoring device is a light-emitting diode.

12. The hand-held transmitter according to claim 6, wherein means for selectively radiating at least two different signals at a radar detector comprises at least two different transmitters which are alternately unshielded for signal emission by said conductive surface which is position dependent with respect to the radar detector.

13. The hand-held transmitter according to claim 6, wherein said means for selective directional radiation of at least two different radio frequency signals at a radar detector comprises an oscillator circuit, and wherein said shielding means is position dependent with respect to the radar detector and shields said oscillator circuit to effect radiation of different signals at the radar detector.

14. An apparatus for testing a radar detector, said apparatus comprising:
a housing;
at least one frequency transmitter mounted in said housing;
battery means in said housing for powering said transmitter;
voltage indicator means for monitoring voltage of a battery in said battery means;
switch means for connecting said voltage indicator means and said transmitter to said battery means; and
shielding means being located in said housing to shield said housing from the frequency from said transmitter, wherein said shielding means includes a double-sided conductive circuit board.

15. A method to verify the performance of a police band radar detector comprising the steps of:
a) transmitting, through an electromagnetic field transmitter apparatus, an electromagnetic signal of field strength no greater than 500 microvolts/meter at 3 meters from the transmitter apparatus to an adjacent radar detector device;
b) positioning the transmitter apparatus at a distal location from the radar detector under test until loss of signal inactivates alert circuitry;
c) utilizing the distal location as a distance standard for performance of the radar detector device.

16. An apparatus for testing a radar detector, said apparatus comprising:
a housing;
at least one frequency transmitter mounted in said housing;
means in said housing for receiving energy from an energy source to power said transmitter;
voltage indicator means for monitoring voltage of said energy source;
switch means for connecting said voltage indicator means and said transmitter to said receiving means; and
shielding means being located in said housing to shield said housing from the frequency from said transmitter, wherein said shielding means includes a double-sided conductive circuit board.

* * * * *